April 30, 1968 F. HORSTMANN 3,380,742

RECORD PLAYERS FOR PLAYING SELECTED SIDES OF SELECTED DISC RECORDS

Filed Feb. 16, 1967 3 Sheets-Sheet 1

Inventor:
Friedel HORSTMANN
by: Arthur O. Klein
his Attorney

INVENTOR:
Friedel HORSTMANN
BY Arthur O. Klein
his Attorney

April 30, 1968 F. HORSTMANN 3,380,742

RECORD PLAYERS FOR PLAYING SELECTED SIDES OF SELECTED DISC RECORDS

Filed Feb. 16, 1967 3 Sheets-Sheet 3

INVENTOR:
Friedel HORSTMANN
BY Arthur O. Klein
his Attorney 3,380,742
RECORD PLAYERS FOR PLAYING SELECTED SIDES OF SELECTED DISC RECORDS
Friedel Horstmann, Espelkamp-Mittwald, Germany, assignor to Wilhelm Harting Werk fuer Elektrotechnik und Mechanik, Espelkamp-Mittwald, Germany
Filed Feb. 16, 1967, Ser. No. 616,543
Claims priority, application Germany, Feb. 17, 1966, H 58,582
17 Claims. (Cl. 274—10)

ABSTRACT OF THE DISCLOSURE

A record player in which a rotary magazine carries a supply of records from which the selections are made. The rotary magazine has a horizontal axis of rotation and is driven by a belt drive which includes a belt which extends at least partly around the rotary magazine to prevent records from falling out from the latter. The record player includes a rotary turntable which is also situated in a vertical plane and has also a horizontal axis of rotation, and this turntable is small enough to engage only the central ungrooved portion of a disc record while located close enough to the magazine to situate a part of a record, during playing thereof, in the magazine itself. Both of the grooved sides of a disc record are therefore exposed during turning of the record by the turntable, and a tone arm is displaceable to one or the other sides of the record in the playing position and carries a pair of needle assemblies for engaging one or the other sides of the record, these needle assemblies being set for different directions of rotation so as to coact with the selected side of the record which is to be played. The shifting of the tone arm to one or the other sides of the record which is to be played, the holding of a record against the vertical turntable, the transfer of a record from the magazine to the turntable and then back to the magazine, and the swinging of the tone arm during the actual playing of the record are all controlled, respectively, by four cams carried by a single rotary cam shaft which is also situated closely adjacent to the rotary magazine. A reversible motor coacts through a transmission means on the one hand with the belt drive for the rotary magazine and on the other hand with the cam shaft, and a pair of one-way clutches form part of the transmission means and coact with the latter to transmit only one direction of rotation from the reversible motor to the cam shaft and only the other direction of rotation from the reversible motor to the belt drive, respectively.

*Specification*

The present invention relates to record players.

More particularly, the present invention relates to that type of record player in which it is possible to select from a supply of records which are in a magazine records to be played as well as to select those sides of the disc records which are to be played. Such record players can, for example, be coin operated.

The record player of the invention has a horizontal axis of rotation for the rotary magazine and also has a horizontal axis of rotation of the turntable, so that the latter is in a vertical plane, and while record players having magazines which turn about a horizontal axis and vertical turntables are already known, the known record players of this type possess several disadvantages in that the arrangement of the parts thereof and the construction of these parts require an undesirably large space to be occupied by the known structure and render it undesirably heavy as well as unreliable in operation. For example, one known construction of this type has a playing mechanism which includes the tone arm and which is motor-driven and coacts with a turntable which rotates in the same direction as that in which the playing mechanism is turned by the motor thereof, the rotation of the mechanism requiring a certain direction depending upon which side of the record is being played, so that this known construction is extremely expensive and subject to rapid wearing of its components, and in addition this mechanism requires a large number of control elements. Furthermore, because of the large size of the known structure, it is not possible to use it in small music boxes.

It is a primary object of the present invention to provide a record player of the above type, which, however, requires far less space than conventional record players of this type, while at the same time being of considerably less weight than the conventional constructions and having a far more reliable operation.

In addition, it is an object of the present invention to provide a construction of this type which is relatively simple in its construction and which has a much lower manufacturing cost than the conventional record players of this general type.

Thus, it is an object of the invention to provide a construction which will avoid the drawbacks of the known structures while at the same time occupying only a small space, having a light weight, and being composed of elements which are simply and clearly connected together in an easily understandable manner, the components of the structure of the invention being relatively small in number as well as rugged in construction, providing the highest possible reliability in the operation.

The record player of the invention includes a rotary magazine means which has horizontal axis of rotation and which has a front filling region situated on one side of a vertical plane passing perpendicularly through the axis of rotation of the magazine means substantially midway between the ends thereof. At this front filling region, close to the rotary magazine means, is situated a rotary turntable which is in a vertical plane and which has a horizontal axis of rotation perpendicular to that of the rotary magazine means, this turntable being of a diameter small enough to engage only the central, ungrooved portion of a disc record so as to leave both of the grooved sides thereof exposed. A belt drive means coacts with the rotary magazine means to turn the latter so as to situate a selected record in a transfer position for transfer from the latter to a playing position engaging the turntable, and the belt drive includes a belt which directly engages the rotary magazine means to prevent records from falling out of the latter. A releasable holding means is provided for releasably holding a record, which is in the playing position, centrally against the rotary turntable to be turned thereby, and a transfer means is provided for transferring a record from a transfer position to the playing position and, after playing of the record, back to the transfer position. A tone arm means carries a pair of needle assemblies for respectively coacting with the opposed sides of the record in the playing position to play one or the other sides thereof, and a shiftable support means carries the tone arm means not only to support the latter for swinging movement during playing of a selected side of the record but also to shift the tone arm means from one location situated at one side of the record in a playing position during playing of the one side thereof to another location situated at the other side of the record in a playing position during playing of the other side thereof, the pair of needle assemblies which are carried by the tone arm means respectively being set to provide for playing of the record during rotation in the different directions depending upon which side is being played. A rotary cam shaft is situated at that side of the vertical plane which passes through the turning axis of the magazine means which is opposite from the front side thereof where the filling region of the magazine is located, and this rotary cam shaft carries four cam means one of which coacts with the transfer means to actuate the latter, the second of which coacts with the releasable holding means to actuate the latter, the third of which coacts with the tone arm to swing the latter to play a selected side of the record in the playing position, and the fourth of which coacts with the shiftable support means which shift the latter between the above-mentioned locations so as to locate the tone arm at the selected side of the record. A reversible motor acts through a transmission means to transmit a drive on the one hand to the cam shaft and on the other hand to the belt drive which rotates the magazine means, this transmission means including a pair of one-way clutch means one of which participates in the transmission of the drive to the cam shaft to rotate the latter only in response to rotation of the reversible motor in one direction and the other of which participates in the drive from the reversible motor to the belt drive means to transmit the drive thereto only when the reversible motor rotates in the opposite direction.

The invention is illustrated by way of example in the accompanying drawings which form part of this application and in which.

Figure 2:
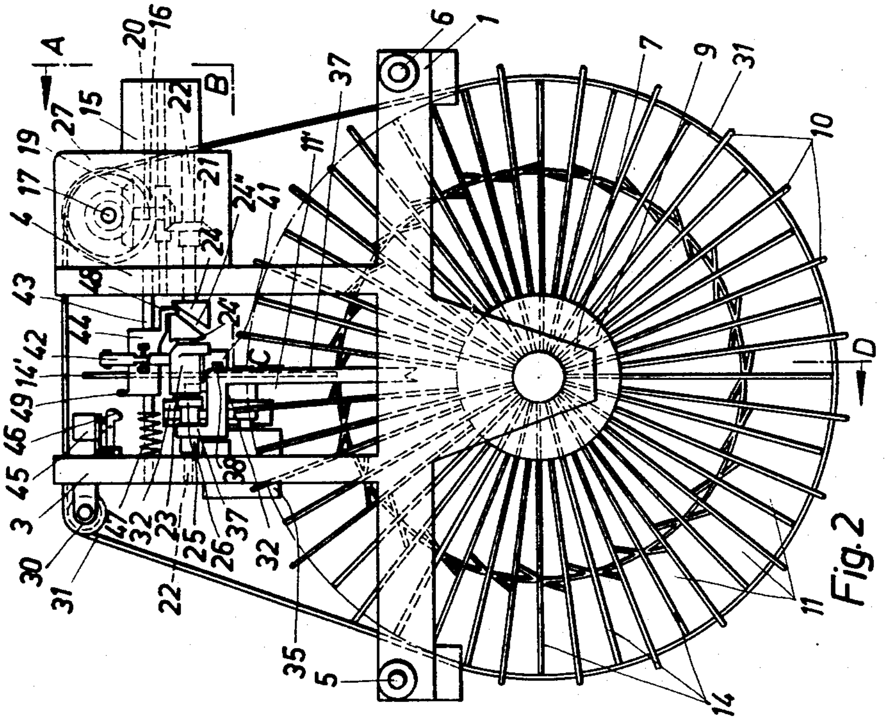
FIG. 2 is a rear end of the structure of FIG. 1, as seen from the right of FIG. 1.

The structure of the invention includes a stationary support means composed of a rear transverse support member 1 and a front transverse support member 2. The supporting framework includes longitudinally extending support members 3, 4, 5, 6 which extend between and are connected to the transverse members 1 and 2 so as to form therewith a supporting framework for the remaining structure. The rear and front transverse supports 1 and 2 are respectively provided with bearings 7 and 8 which define the horizontal axis of rotation of a rotary magazine means 9 of the invention, this rotary magazine means 9 including a horizontal shaft extending between and supported by the bearing 7 and 8 as well as end discs fixed to the shaft and carrying radially extending record-holding members 10 in the form of wires, or rods, having the configuration shown most clearly in FIGS. 1 and 2, and respectively situated for the most part in radial planes so that these members 10 define between themselves the pockets 11 in which the several records 14 are respectively located. Between their outer and inner ends, the record holders 10 have substantially V-shaped portions shown in FIG. 2 which respectively engage the opposed faces of the records so as to reliably hold the latter in predetermined positions in the pockets 11.

A record selecting device of known construction includes a portion 12 which rotates with the magazine and a stationary portion 13 with respect to which the portion 12 turns so as to locate a selected record in a transfer position. The stationary unit 13 of the record selecting devise is carried by the front transverse support 2.

The stationary support means includes a pair of longitudinal supports 3 and 4 which are of substantially arcuate configuration and which extend over the space occupied by the rotary magazine means 9, with the front ends of the longitudinal supports 3 and 4 being fixed to and extending upwardly from the front transverse support 2 while the rear ends of the longitudinal supports 3 and 4 of FIG. 2 are fixed to and extend upwardly from the rear transverse support 1. In addition the stationary support means includes the longitudinally extending side bars 5 and 6 which extend between and are fixed to the transverse supports 1 and 2.

The rotary magazine means 9 has a front filling region 33 situated in front of a vertical plane which passes perpendicularly through the horizontal axis of rotation of the rotary magazine means substantially midway between the ends of the latter. On the rear side of this latter plane is located a rotary cam shaft 22 which is supported for rotation by suitable bearings carried by the longitudinal stationary supports 3 and 4, and this cam shaft 22 has a horizontal axis which is perpendicular to that of the magazine means 9.

A reversible motor 15 is provided for driving the cam shaft 22, and this reversible motor 15 drives the cam shaft through a transmission means which includes a worm drive 16, a shaft 17 driven by the worm drive, a first pair of bevel gears 19 driven from the shaft 17, a shaft 20 driven by the latter bevel gear assembly, and a second bevel gear transmission 21, this latter transmission being connected directly to the cam shaft 22 so as to rotate the latter. This transmission includes on the shaft 17 thereof a one-way clutch means 18 which acts to transmit only one direction of rotation of motor 15 from the shaft 17 to the pair of meshing bevel gears 19. For example, the one-way clutch means 18 can include a known coil spring loosely coiled about the shaft 17, and frictionally engaging the latter while having one end fixed to the hub of the vertical bevel gear 19 shown at the upper left of FIG. 1. With this construction when shaft 17 rotates in one direction it will tend to open and spread to the convolutions of the coil spring of the one-way clutch 18 so that the latter will not transmit any rotation to the bevel gear transmission 19, while in the other direction of rotation of the shaft 17 the frictionally coacting coils of the clutch will tend to be turned in a direction which tends to close the coils, reducing their diameter and causing them to tightly grip the shaft 17 so that only in this latter direction of rotation will the drive be transmitted from the motor 15 to the cam shaft 22.

The part of the cam shaft 22 which is situated between the longitudinal supports 3 and 4 fixedly carries four cam means 23, 24, 25 and 26 which bring about the necessary controls in connection with record changing and record playing. The entire transmission from the motor 15 to the shaft 22, including a part of the latter, is situated within a dust-tight housing 27 which is carried by the longitudinal support member 4, while the reversible motor 15 itself is carried by the housing 27 at the exterior thereof.

The shaft 17 extends forwardly through and beyond the housing 27 where the front end of the shaft carries a second one-way clutch means 28 which may be identical with the clutch means 18 but which is set to respond and become engaged upon rotation of the shaft 17 in a direction opposite to that which engages the clutch 18, so that it is only when the shaft 17 is rotated by the reversible motor 15 in the opposite direction of rotation that the clutch means 28 becomes engaged.

The coil spring of the clutch means 28 has one end connected to the hub of a pulley 29 of a belt-drive means which drives the rotary magazine means 9, so that it is only when the reversible motor 15 rotates in a direction where the clutch 18 is disengaged that the clutch 28 responds to transmit the drive to the rotary magazine means 9. The belt drive includes, in addition to the pulley 29, a second pulley 30 supported for rotary movement by a suitable bracket carried by the longitudinal support 3, and the belt 31 passes around the pulleys 29 and 30 as well as around and in engagement with the record holding components 10 of the magazine means, these latter components being arranged in a manner similar to the spokes of a wheel, so that in this way the endless belt 31 will at all times extend around and engage the lower portion of the magazine means to prevent records from falling out of the latter. Thus, with this arrangement it is only clockwise turning of the reversible motor 15, for example, which will result in transmitting of a drive to the cam shaft 22, while counter-clockwise turning in this case results only in driving of the magazine.

The starting and stopping of the motor 15 as well as the selection of the direction of rotation thereof is brought about by way of an unillustrated known control structure of the record changer which, in a known way, operates according to the particular record changing phase which is being carried out.

A rotary turntable 32 is supported for rotary movement about a horizontal axis by a suitable bearing structure carried by the longitudinal support 3, and the diameter of the turntable 32 is small enough so as to be somewhat less than the central ungrooved portion of a disc record. Thus, the turntable 32 rotates in a vertical plane, and it will be noted that its axis of rotation is perpendicular to the horizontal axis of rotation of the magazine means 9. The location of the turntable 32 is such that its plane coincides with the plane in which is located that record 14 which is situated in the uppermost pocket 11' of the rotary magazine means 9, and it is the uppermost pocket of the rotary magazine means which locates the record therein in the transfer position from which this uppermost record will be transferred into a playing position engaging the turntable 32. As is apparent particularly from FIG. 1, in the arrangement of the invention the rotary turntable 32 is located extremely close to the circular surface of revolution described by the rotary magazine means 9 when the latter is filled with records, this turntable 32 being situated at the front filling region 33 in front of the vertical plane which passes substantially midway between the ends of the magazine means 9 perpendicularly to the horizontal turning axis thereof. The turntable 32 is situated over the axis of the magazine means 9 at an elevation higher than the record selecting structure 12, 13. Thus, the cam shaft 22 and the turntable 32 are respectively situated at opposite sides of the vertical plane which passes perpendicularly through the rotary axis of the magazine means 9 between the ends thereof, with cam shaft 22 situated at the rear side of this latter plane while the turntable 32 is situated at the front side thereof closely adjacent to the rotary magazine means. It will be noted that the cam shaft 22 is also located closely adjacent to the magazine means, thus contributing to the compactness of the entire assembly.

A record 14' is shown in the playing position having its central ungrooved region engaging the turntable 32. As is also apparent from FIG. 1, this record 14' which is in the playing position still extends in part into the magazine means 9, so that the structure of the invention is so compact and occupies such a small space that the records never entirely move out of the magazine means 9. Thus, with the structure of the invention the entire apparatus requires, as a result of the location of the parts, which will never displace the record entirely out of the magazine means, such a small space and gives to the parts such a small weight that the structure of the invention provides a very decided advance over the known structures.

The rotary turntable 32 is driven by a belt 34 which is in turn driven from a motor 35 which is carried by the longitudinal support 3 and which is reversible. The record-playing motor 35 will be selectively rotated through a suitable control structure actuated by the operator, to provide for the turntable either one direction of rotation or another direction of rotation, depending upon the particular side of the record which is selected to be played.

Figure 1:
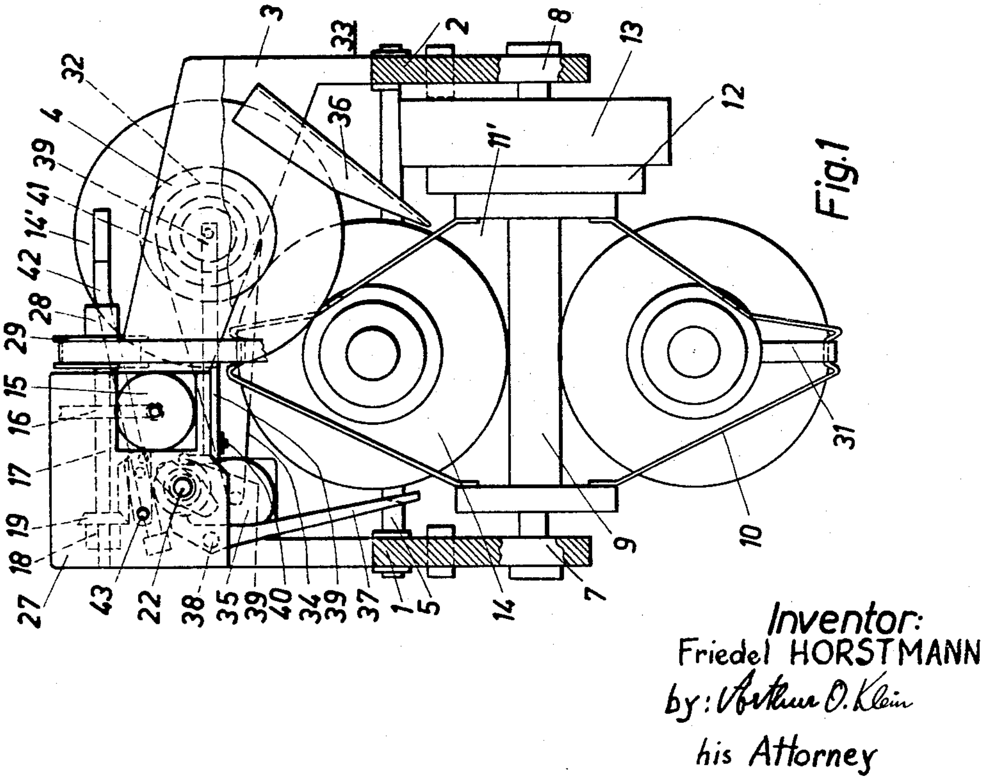
FIG. 1 is a partly sectional schematic side view of one possible embodiment of a record player according to the invention, the section of FIG. 1 being taken along line ABCD of FIG. 2 in the direction of the arrows.

A transfer means is provided for transferring the selected record from the transfer position situated in the uppermost pocket 11' to the playing position 14', and, after the record is played, back from the playing position 14' into the transfer position in the uppermost pocket 11'. This transfer means includes a stationary guide chute 36 which has a bottom end extending downwardly toward the lowermost region of the uppermost pocket 11', this guide member 36 being inclined upwardly and toward the right from its lower end, as shown in FIG. 1, so that the guide member 36 will receive a part of the selected record to guide the latter during its movement between the transfer and playing positions. This guide member 36 is fixed by suitable members between the longitudinal supports 3 and 4 and acts as a connecting link between the rotary magazine means 9 and the rotary turntable 32. The guide member 36 provides for each record a guide path which extends along a line which is situated approximately at the radial distance from the center of a record 14 in the uppermost pocket 11' to the outer periphery of this record up to the same radial size of a record from the center of the turntable 32. During their transfer, each record will slide or roll along the guide 36.

The transfer means further includes a transfer lever 37 having a horizontal axis of rotation provided by way of a horizontal pivot pin 38 fixedly carried by and projecting from the longitudinal support member 3. This lever 37 has arms of unequal length, and a longer arm thereof extends downwardly from the pivot 38 and is forked at its lower end so as to provide a substantially V-shaped notch which receives the periphery of the record during transfer thereof. During swinging of the transfer lever 37 in a counterclockwise direction about the pin 38, as viewed in FIG. 1, the lower end of the lever 37 will engage the record 14 which is in the transfer position and will raise it up to the playing position 14'. In this way the central portion of the record will be brought into alignment with the turntable 32. This lever 37 will also act to support the record during its return back into the transfer position. The lever 37 has the curvature indicated in FIG. 1, and its upper shorter lever arm is bent or curved so as to coact with the cam 26 which is carried by the cam shaft 22 for rotation therewith, so that it is through this cam 26 that the transfer means is actuated for transferring a record between the transfer and playing positions thereof.

Figure 5:
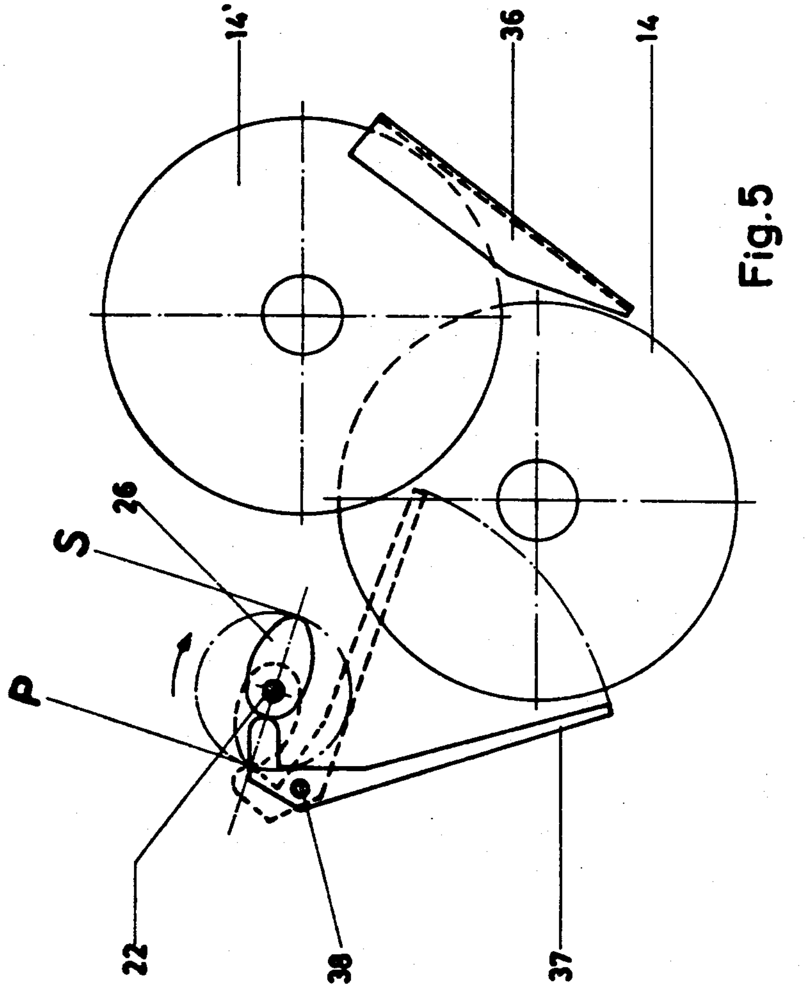
FIG. 5 shows schematically on an enlarged scale the structure for moving a record between the magazine and the turntable.

FIG. 5 shows in solid lines the lower positions and in dotted lines the upper position of the record lifting lever 37.

Also, FIG. 5 shows schematically the cam 26. At the position marked S, the operator will select the next record to be played, and then the cam shaft turns through 180° in a clockwise direction, as indicated by the arrow in FIG. 5, up to the position P, which indicates the play position, and at this time all of the operations in connection with transfer of a record to the turntable and readying the record for playing have been completed. The cam shaft 22 stops rotating at this time and the playing of the record takes place. After the playing of the record has been completed the cam shaft 22 again turns through 180° back to the select position, and during this time all of the operations in connection with return of a record to the magazine take place.

Figure 4:
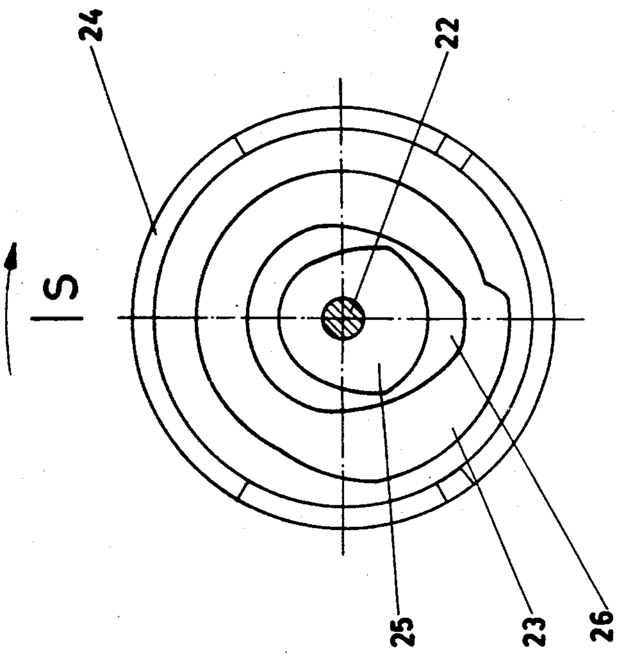
FIG. 4 is a schematic illustration of the relationship between the cams.

The select and play positions are also indicated in FIG. 4 which schematically indicates the relationship between the several cams. It is through the cam 23 that the tone arm 42 is initially moved to the record with a needle entering the groove thereof preparatory to playing of the record, and this cam 23 displaces the tone arm beyond the range of the record after the playing thereof has been completed.

A releasable holding means is provided for releasably holding a record in the playing position 14' centrally with respect to the rotary turntable 32. This releasable holding means includes a plate-engaging device 39 in the form of a double-armed lever having a vertical turning axis defined by a pivot pin 40 which is carried by the longitudinal support 3 and which extends in a vertical direction, this pivot pin 40 extending between the ends of the lever 39 so that the latter has a front longer arm which extends forwardly to the region of the turntable 32, while the rear shorter arm of the lever 39 is suitably curved to coact with the cam means 25 which is carried by the cam shaft 22 for rotary movement therewith. At its front free end the lever 39 carries a known construction which engages and centers a record 14' with respect to the turntable 32 so as to hold the record centrally and reliably against the turntable so as to rotate therewith. Thus, during rotation of the cam shaft 22, the longer forwardly extending lever arm of the lever 39 will displace the record-engaging device 41 carried thereby and which is of a known record centering and holding construction, toward and away from the turntable 32 so as to displace a transferred record which is in the playing position either against the turntable 32 to hold it reliably pressed against the latter for rotation therewith or to release the record for movement away from the turntable 32, so that the record can then move down the guide 36 back to the transfer position. Thus, the holding means 39, 41 will act, when a record is to be played, to press the latter centrally against the turntable 32 while after the playing of the record during a further turning of the cam shaft 22 its cam 25 will turn so as to act on the lever 39 to displace the device 41 away from the turntable 32, thus permitting the record, while supported by the lower forked end of the lever 37, to return to its transfer position, the record also being supported at this time on the guide 36.

Thus, during each operation the shaft 22 will turn through one fraction of a revolution in connection with the displacement of the record from the transfer to the playing position, and at this time the cam 26 will act on the transfer means to raise a record to the playing position while the cam 25 will then act on the releasable holding means to hold a record against the turntable 32, and then after the record is played the shaft 22 will turn through a succeeding part of a revolution in order to actuate the record holding means by the cam 25 to release a record from the table and in order to act through the cam 26 on the transfer means for returning the record, which at this time slides or rolls back into the uppermost pocket 11' of the magazine 9.

As a result of the opposed directions of rotation of the motor 15, the shaft 22 will not be capable of turning and remains stationary when the one-way clutch means 18 is disengaged and when the rotary magazine means 9 is turned, by engagement of the clutch 28, to an extent determined by the record selecting device 12, 13, so that the magazine means 9 will be turned until another selected record has reached the transfer position where the pocket in which it is situated will be located at the uppermost part of the magazine means at the position 11'. Now the direction of rotation of the motor 15 will be reversed so that there will now be a drive through the clutch 18 to the shaft 22 thus bringing about the transfer of a record from the transfer position to the turntable 32 and the gripping or releasable holding of the record in the playing position against the turntable 32, the cams 26 and 25 controlling these operations.

During that phase of each operating cycle when a record is rotated by the turntable 32 so that a selected side thereof is to be played, the motor 35 is started so as to rotate the turntable 32 in one direction or the other depending upon the selected side of the record which is in a playing position 14', and in order to play the record there is a tone-arm means 42 carrying a pair of needle assemblies, in the form of sapphire or diamond needles, these assemblies being respectively set in predetermined directions which will coact properly with the particular direction of rotation of the record, depending upon that side thereof which is selected to be played. The tone arm means 42 is supported for swinging movement in a substantially vertical plane, during actual playing of a record, by a shiftable support means described in greater detail below, and the vertical swinging of the tone arm 42 is brought about by way of the cam means 23 which is fixed to the shaft 22 for rotary movement therewith.

The shiftable support means includes a stationary horizontal rod 43 which extends between and is fixedly carried by the longitudinal supports 3 and 4, this rod 43 being parallel to the axis of turning of the turntable 32. The rod 43 extends slidable through bores which are respectively formed in a block 44 of the shiftable support means, and it is this block which carries a suitable bracket which supports the tone-arm 42 for swinging movement about a horizontal axis in a vertical plane. The shifting of the block 44 is brought about by the cam means 24 in the form of a cam fixed to the shaft 22 for rotary movement therewith and having a pair of distinct cam tracks formed by a camming groove which provides the cam 24 with the separate and distinct cam tracks 24' and 24'', these distinct cam tracks receiving a downwardly directed finger of the block 44 which forms in this way a follower therefor. The finger-follower 48 of the block 44 is clearly apparent in FIGS. 2 and 3. The cam tracks 24' and 24'' communicate with each other at relatively small switching portions where the finger 48 can be switched from one to the other of the cam tracks. As may be seen from FIG. 2, according to the selected side of the record which is in the playing position 14', the cam 24 can act on the block 44 so as to shift the tone-arm 42 either to the left side of a record 14' or to the right side thereof, as viewed in FIG. 2. This shifting movement provided by the shiftable support means 44 of course takes place along a path which is parallel to the axis of rotation of the turntable 32.

After every cycle of operation has been completed, the parts will assume a predetermined rest position, and in this rest position the cam 24 will situate the block 44 at all times in the region of its left location where it is situated at the left side of the plane occupied by a record 14 which is in the playing position 14'. A releasable lock means coacts with a second finger 49 of the block 44 for releasably locking the latter in its rest position where the tone-arm 42 will be situated at the left side of a record in the playing position, as viewed in FIG. 2. This releasable lock means includes a swingable lock member 46 (FIGS. 2 and 3) supported for turning movement by any suitable bracket carried by the support 3 and operatively connected with the armature of a solenoid 45 which thus forms an electromagnet capable of being actuated according to the selection of the operator so as to be placed in a locking or unlocking position. To be displaced to the unlocking position the electromagnet 45 is energized thus raising the hook-shaped lock member 46 to release the finger 49. Thus, the electromagnet 45 when it is unenergized will result in retaining of the block 44 at its left location where the tone-arm is situated to play the left side of a record. The lock member 46 coacts with the finger 49 and the block 44 at this time to retain the block 44 at its left location as viewed in FIG. 2, in opposition to the force of a compression spring 47 which forms a spring means urging the block 44 to its right location, and the displacement of the block 44 by the cam 24 to its rest position located to the left of the plane of the playing position 14' takes place in opposition to the spring 47 which is compressed at this time. This spring 47 is situated in the path of movement of the block 44 to the left and may be supported by the rod 43, for example. At this time, which is to say, during playing of the left side of the record, as viewed in FIG. 2, it is only required that the cam means 24 act on the tone-arm 42 to displace the latter into and out of engagement with the left side of the record, and this requires a small degree of shifting movement of the block 44 along the rod 43. This horizontal movement of the shiftable support means at this time is brought about by the left cam track 24' which is capable of shifting the block 44 to the left somewhat beyond its rest position to displace the right needle assembly carried by the tone-arm away from the record, while the cam track 24' can release the block 44 to have the tone-arm returned to the position where the right needle assembly carried thereby, as viewed in FIG. 2, will coact with the record during the playing thereof. Because of the extremely small degree of horizontal movement required to be produced by the cam track 24', it has practically no pitch with respect to the axis of the cam and thus takes the form of a circular groove which is almost entirely in a plane normal to the axis of the cam shaft 22.

Figure 3:
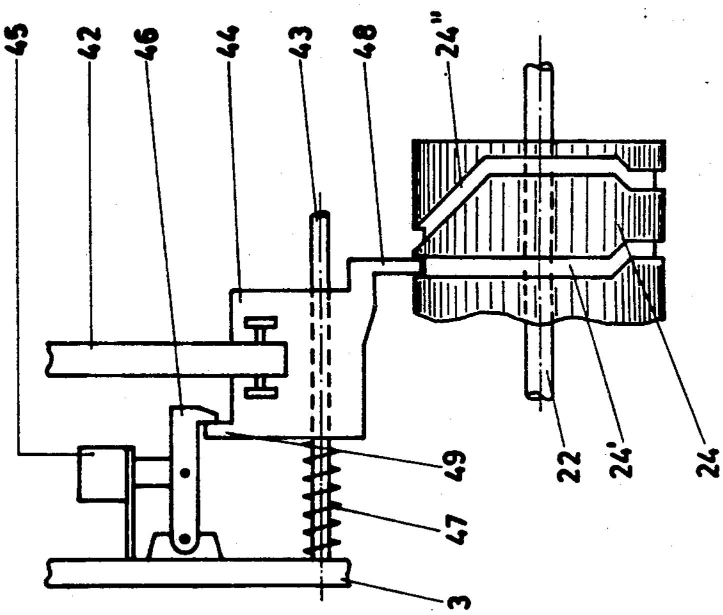
FIG. 3 shows on an enlarged scale part of the cam structure and a releasable lock means.

The cam track 24" comes into play in order to coact with the tone-arm for displacing the latter to its right position for playing the right side of the record, as viewed in FIG. 2. As contrasted with the cam track 24', the cam track 24" has a very large pitch in one direction, within 180° about the axis of the cam shaft 22, and then in the opposite direction within 180° about the cam shaft 22. The cam track 24" rejoins the initial part of the cam track 24' as well as communicates with the cam track 24' at relatively small switching portion where both cam tracks communicate with each other. Thus, the oppositely directed steeply inclined portions of the cam track 24" both terminate at and communicate with the substantially circular cam track 24' and at the regions distant from the cam track 24' the sharply inclined portions of the cam track 24" are provided with portions having a smaller radius of curvature smoothly merging into the remainder of the cam track (FIG. 3) of movement of the follower-finger 48. The curvature of the cam track 24" is such that it will use its first sharply inclined portion to displace the arm to the right location after which the curvature is such as to displace the left needle assembly of the arm against the right side of the record. When the end of the playing is reached the finger 48 enters the other portion of the cam track 24" to initially be moved away from the record and then to be returned to the other side back to the rest position. As is apparent from FIGS. 3 and 4, those sides of cam tracks 24' and 24" not seen in FIG. 3 are mirror images of those visible in FIG. 3.

When the right side of the record, as viewed in FIG. 2, is selected to be played, the electromagnet 45 is energized so as to raise the locked member 46 away from the finger 49, thus releasing the shiftable block 44 to the force of the spring 47 which now acts to shift the finger 48 at the switching portion of the cam tracks 24', 24" where they merge into each other, and at this time the force of the spring 47 will act to locate the finger 48 in the cam track 24". Thus, when the cam shaft 22 now starts to rotate the finger 48 will be in the cam track 24" and block 44 will be shifted to the right to locate the tone-arm 42 in a proper location for playing the right side of the record. At this time the record will be turned in the reverse direction by the motor 35 which during playing of the right side of a record turns the turntable 32 in a direction which is the reverse of its direction during playing of the left side of the record. After the right side of the record has been played, the cam track 24" left coacts with the finger 48 to shift it during further turning of the cam shaft 22 to the left, in opposition to the spring 47 which is again compressed, and this action takes place until the finger 49 snaps behind the hook 46 of the releasable lock means. Now the shiftable support means will be held in its left location where it will remain if it should happen that the next selection is the left side of the record, as pointed out above. If not, the above operations will be repeated.

The faultless carrying out of all of the operations involved in the record-changing and record-playing, such as rotating of the magazine means 9, transfer of a record 14 from the transfer position to the playing position, holding of the record at the playing position and bringing of the tone-arm support means 44 to a selected location for playing a selected side of the record, together with the swinging of the tone-arm 42 during the actual playing of the record with a needle assembly coacting with the grooves thereof, as well as the movement of the tone-arm away from the record after it has been played, and return of the record to its transfer position, are brought about not only by the arrangement of the pair of one-way clutches 18 and 28, which will transmit rotation of the driving motor 15 in one direction only to the cam shaft and in the other direction only to the magazine, but also by the arrangement of the cams 23, 24, 25 and 26 on the cam shaft 22 and the arrangement of the supporting guide 36 which guides each record during its movement between its transfer and playing positions. Furthermore, it is apparent that with the structure of the invention the mechanically functioning elements are arranged with respect to each other in the smallest possible space and have an extremely light weight while being organized in a very clear and simple manner which renders immediately apparent how all the parts are interrelated with each other and how they function together and which at the same time keeps the manufacturing costs very low while still providing a highly effective record-changing and record-playing mechanism capable of being used to select, in coin-operated music boxes or the like, a given record as well as a given side thereof to be played in a fully automatic manner once the selection is made.

What is claimed is:

1. In a record player for playing selected sides of selected disc records, rotary magazine means for containing a supply of disc records, said rotary magazine means having a horizontal axis of rotation and said rotary magazine means having a front filling region situated on one side of a vertical plane which passes perpendicularly through said horizontal axis of rotation substantially midway between opposed ends of said rotary magazine means, belt drive means coacting with said rotary magazine means for rotating the latter about said horizontal axis of rotation thereof for displacing a selected record to a transfer position from which the selected record is then transferred to a playing position and after playing back to said transfer position, said belt drive means including a belt extending at least partly around said rotary magazine means to prevent records from falling out of the latter, a rotary turntable also having a horizontal axis of rotation, said turntable being situated in a vertical plane over the axis of rotation of said rotary magazine means closely adjacent to the latter at the front filling region thereof, the horizontal axis of rotation of said turntable being perpendicular to the horizontal axis of rotation of said rotary magazine means and said turntable having a diameter small enough to engage only the central ungrooved portion of a disc record when a record is in a playing position so as to leave exposed both of the opposed grooved faces of a disc record, transfer means coacting with said rotary magazine means for transferring a record from said transfer position to said playing position where said central ungrooved portion of the transfer record is engaged by said turntable and after playing of the record for transferring the played record back to said transfer position, releasable holding means coacting with said turntable for releasably holding a record which is in said playing position centrally against said turntable to be rotated thereby, tone-arm means carrying a pair of needle assemblies for respectively engaging opposed grooved faces of a record in said playing position to play a selected side thereof, said pair of needle assemblies respectively being set for different directions of rotation of a record in said playing position so that one of said needle assemblies when engaging one side of a record in said playing position is set for one direction of rotation while the other of said needle assemblies when engaging the other side of the record in the playing position is set for an opposed direction of rotation, shiftable support means supporting said tone arm means not only for swinging movement substantially in a vertical plane parallel to that in which said turntable is located during playing of a record but also for shiftable movement in a direction parallel to the axis of rotation of said turntable to a location situating said tone arm at one side of the record in the playing position for placing one of the needle assemblies in engagement with said one side of the latter record or to a location situated at the other side of the record in said playing position for placing the other needle assembly in engagement with the other side of the record, rotary cam shaft means situated closely adjacent to said rotary magazine means at a rear side of said vertical plane which passes perpendicularly through the horizontal axis of rotation of said rotary magazine means, at the side of said latter plane opposite from said turntable, four cam means respectively carried by said rotary cam shaft to be rotated thereby, one of said cam means coacting with said transfer means to actuate the latter, the second of said cam means coacting with said releasable holding means for actuating the latter, the third of said cam means coacting with said tone arm for turning the latter substantially in said vertical plane which is substantially parallel to the plane in which said turntable is located, so that said third cam means actuates said tone arm during turning of the latter while playing a selected side of a selected record, and the fourth of said four cam means coacting with said shiftable support means for shifting the latter between said locations to place said tone arm in a position for playing a selected side of a record which is in said playing position, reversible motor means, transmission means coacting with said reversible motor means, as well as with said rotary cam shaft and said belt drive means, for transmitting rotation of said reversible motor means on the one hand to said cam shaft and on the other hand to said belt drive means, and a pair of one-way clutch means both forming part of said transmission means and participating in the transmission of a drive from said reversible motor to said cam shaft and belt drive means for transmitting rotation of said reversible motor in only one direction to said rotary cam shaft and for transmitting rotating of said motor only in an opposite direction to said belt drive means, respectively.

2. The combination of claim 1 and wherein said transfer means includes a stationary guide situated at said front filling side of said magazine means for guiding a record during movement thereof between said transfer and playing positions along a path which is inclined upwardly and forwardly from said magazine means.

3. The combination of claim 1 and wherein said turntable means is situated at a distance from said rotary magazine means small enough to situate a record which is in said playing position at a location where the latter record still extends partly into said magazine means.

4. The combination of claim 1 and wherein a releasable lock means releasably locks said shiftable support means at one of said locations and wherein a spring means coacts with said shiftable support means for urging the latter to the other of said locations, said fourth cam means displacing said shiftable support means to said one location where it is releasably locked by said releasable lock means in opposition to said spring means, and said releasable lock means being actuated to release said shiftable support means to the action of said spring means when the other side of a record in said playing position, requiring the tone arm to be situated at the other of said locations, is selected for playing.

5. The combination of claim 1 and wherein a stationary support means includes a pair of longitudinal support members extending through said vertical plane which passes perpendicularly across the axis of rotation of said magazine means substantially parallel to the latter axis of rotation over said rotary magazine means, said shiftable support means including guide rods extending between and carried by said pair of support members of said stationary support means and extending parallel to the axis of rotation of said turntable, said shiftable support means further including a block slidably carried by said rods for shiftable movement there along and supporting said tone arm for substantially vertical swinging movement.

6. The combination of claim 5 and wherein said fourth cam means includes a rotary cam member carried by said cam shaft for rotation therewith and formed with a camming groove of predetermined configuration, said block having a follower finger extending into said groove so that the shifting of said block along said rods is controlled by the camming groove of said fourth cam means, said cam shaft also extending parallel to the axis of rotation of said turntable.

7. The combination of claim 6 and wherein said camming groove defines a pair of different cam tracks communicating with each other at a relatively short switching section where said finger of said block can be switched from one to the other of said tracks.

8. The combination of claim 7 and wherein both of said cam tracks have portions of different pitches from the remainders of said cam tracks for coacting with said tone arm through said block at the moment when the tone arm is displaced away from a record at the end of the playing thereof.

9. The combination of claim 8 and wherein said block carries a second finger, releasable lock means coacting with said second finger for releasably locking said block at one location where said tone arm is situated on one side of a record in said playing position when the latter side of the record is to be played, said releasable lock means locking said block against movement except for movement by said fourth cam means of said tone arm into and out of engagement with said one side of said record, and spring means coacting with said block for urging the latter to the other of said locations where said arm will be situated at the other side of the record, said fourth cam means displacing said block at the end of the playing of a record to said one location in opposition to said spring means where said block is releasably held by said releasable lock means, and where said spring is ready to displace said block toward the other location thereof.

10. The combination of claim 9 and wherein said lock means coacts with said second finger of said block to release the latter for movement from said one to said other location, said spring means displacing said first-mentioned finger through the switching section of said cam tracks of said fourth cam means away from the cam track which coacts with said block during playing of said one side of said record into the cam track which coacts with said block to displace the latter to the other of said locations for playing the other side of said record.

11. The combination of claim 9 and wherein said spring means is situated in the path of movement of said block from said other to said one location and is in the form of a compression spring which is compressed by said block during displacement of the latter by said fourth cam means to said one location where said second finger will be engaged by said releasable lock means.

12. The combination of claim 11 and wherein said releasable lock means includes an electromagnet for displacing said releasable lock means to said release position thereof when said electromagnet is energized upon selection of the other side of a record in said playing position.

13. The combination of claim 1 and wherein a stationary support means includes a pair of longitudinal support members extending through said vertical plane which passes perpendicularly through said rotary magazine means perpendicularly across the horizontal axis of rotation thereof, said pair of longitudinal supports being respectively situated in planes which are substantially parallel to that in which said turntable is located and said cam shaft extending between and being supported for rotary movement by said pair of longitudinal supports, said cam shaft being substantially parallel to the axis of rotation of said turntable.

14. The combination of claim 13 and wherein all four of said cam means are carried by said cam shaft at that portion thereof which is situated between said pair of longitudinal supports.

15. The combination of claim 1 and wherein said transfer means includes an elongated transfer lever having a pair of lever arms and between said lever arms a horizontal axis of turning which is parallel to the axis of rotation of said turntable, said lever arms being of unequal lengths and the longer of said lever arms extending downwardly from said turning axis of said lever for swinging movement into and out of said rotary magazine means in a plane in which the record at said transfer position is located, and said longer lever arm terminating in a free forked end for receiving an edge of the record at the transfer position to engage said record at said edge thereof during movement of said record by said transfer means between said transfer and playing positions, said lever having over said turning axis thereof a shorter lever arm which engages said first cam means to be actuated thereby.

16. The combination of claim 1 and wherein said holding means for releasably holding a record in said playing position centrally located with respect and against said turntable includes an elongated lever having a vertical axis of turning, said lever extending horizontally and having a pair of unequal lever arms the longer of which extends forwardly from the latter axis of turning and carries at its free end a record-engaging assembly for holding the record centrally against the turntable, said lever having a shorter rearwardly directed arm coacting with said second cam means to be actuated thereby for swinging said latter lever about said vertical axis during movement of said record-engaging assembly into and out of engagement with a record at said turntable for releasably holding the latter record centrally against the turntable.

17. The combination of claim 1 and wherein said transmission means includes a dust-tight housing, said transmission means including between said reversible motor and said cam shaft and within said dust-tight housing a pair of bevel gear assemblies, a drive shaft therefor, and that one of said one-way clutch means which is situated in the transmission of the drive from said motor to said cam shaft, a portion of the latter shaft also being situated within said housing, and said reversible motor being carried by said housing at the exterior thereof.

References Cited

UNITED STATES PATENTS

| | | | |
|---|---|---|---|
| 2,570,040 | 10/1951 | Thorens et al. | 274—10 |
| 2,594,633 | 4/1952 | Freimann | 274—10 |
| 3,100,644 | 8/1963 | Osborne et al. | 274—10 |

HARRY N. HAROIAN, *Primary Examiner.*